United States Patent

Shamoto et al.

[11] Patent Number: 5,865,705
[45] Date of Patent: Feb. 2, 1999

[54] OPERATING APPARATUS FOR AUTOMATIC TRANSMISSION

[75] Inventors: Noriyasu Shamoto; Koji Okada, both of Aichi-ken, Japan

[73] Assignee: Kabushiki Kaisha Tokai-Rika-Denki-Seisakusho, Aichi-ken, Japan

[21] Appl. No.: 813,324

[22] Filed: Mar. 10, 1997

[30] Foreign Application Priority Data

Mar. 19, 1996 [JP] Japan .................................. 8-063526

[51] Int. Cl.⁶ ...................................................... B60R 20/02
[52] U.S. Cl. .......................... 477/79; 74/335; 74/473.18; 74/473.31
[58] Field of Search ............................. 74/473.12, 473.18, 74/473.31, 473.32, 335; 477/81, 79, 78

[56] References Cited

U.S. PATENT DOCUMENTS

| | | | |
|---|---|---|---|
| 4,649,768 | 3/1987 | Kusaka et al. | 74/473.32 X |
| 4,934,208 | 6/1990 | Carlstrom | 74/473.15 |
| 5,022,509 | 6/1991 | Schweiger | 477/81 |
| 5,099,720 | 3/1992 | Raue | 74/473.31 X |
| 5,274,553 | 12/1993 | Boardman | 477/78 X |
| 5,372,050 | 12/1994 | Shinki et al. | 74/473.31 |
| 5,419,412 | 5/1995 | Schwab et al. | 74/335 X |
| 5,425,686 | 6/1995 | Grange | 477/79 |
| 5,527,234 | 6/1996 | Kroeger | 477/81 |
| 5,584,209 | 12/1996 | Issa | 74/335 |

FOREIGN PATENT DOCUMENTS

| | | |
|---|---|---|
| 617911 | 1/1994 | Japan . |
| 617912 | 1/1994 | Japan . |

*Primary Examiner*—Dirk Wright
*Assistant Examiner*—Peter T. Kwon
*Attorney, Agent, or Firm*—Sixbey Friedman Leedom & Ferguson; Thomas W. Cole

[57] ABSTRACT

An operating apparatus for an automatic transmission, comprising: a shift lever which is shifted to each of a plurality of automatic shift ranges in an automatic shift mode; shift position detecting means which detects that the shift lever has been shifted to a specified automatic shift range; a manual shift mode changing switch which is provided in the vicinity of a steering wheel and which is operated for switching the automatic shift mode to a manual shift mode in which each of gear ratios in the automatic transmission can be selected manually when it is detected by the shift position detecting means that the shift lever had been shifted to the specified automatic shift range; and a shift up/down switch which is provided in the vicinity of the steering wheel independently of the manual shift mode changing switch and which is operated for selecting each of the gear ratios in the manual shift mode. Since the manual shift mode changing switch and the shift up/down switch are provided in the vicinity of the steering wheel, the switching between the automatic shift mode and the manual shift mode and the operation for switching between the gear ratios in the manual shift mode can be facilitated.

5 Claims, 2 Drawing Sheets

OPERATING APPARATUS FOR AUTOMATIC TRANSMISSION

BACKGROUND OF THE INVENTION

1. Field of the Invention

The present invention relates to an operating apparatus used for an automatic transmission of a vehicle.

2. Description of the Related Art

Generally, there is provided an operating apparatus for an automatic transmission of a vehicle (which is generally referred to as a shift lever apparatus) in which a shift lever mounted on a floor of the vehicle is shifted to each of a plurality of automatic shift ranges. In recent years, other than the above described operating apparatus, there has been provided an operating apparatus for an automatic transmission in which each of the gear ratios or transmission stages can be selected manually (i.e., an operating apparatus for an automatic transmission which is provided with a manual shift mode).

In the above-described type of operating apparatus, the shift lever can be shifted along a guide slot which is referred to as a H-type shift pattern, the automatic shift mode can be switched to the manual shift mode by inclining or pivoting the shift lever which has been shifted to "D" shift range of the automatic shift ranges in a transverse direction of a vehicle. As described above, when the automatic shift mode has been switched to the manual shift mode, each gear ratio can be selected optionally by the shift lever shifted toward a front or rear side of the vehicle.

However, as described above, a conventional operating apparatus, in which the switching can be effected between the automatic shift mode and the manual shift mode, is structured such that all of the operations are effected by the shift lever mounted on a floor of a vehicle. For this reason, there exist drawbacks in that, in a vehicle running state in which a driver is handling a steering wheel, the above shift operations especially in shifting the shift lever between the automatic shift mode and the manual shift mode and/or shifting the shift lever between gear ratios in the manual mode have been complicated and inconvenient. Accordingly, it has been desired to further improve operability in an operating apparatus for an automatic transmission provided with such a manual shift or operation mode.

SUMMARY OF THE INVENTION

In view of the aforementioned facts, it is an object of the present invention to provide an operating apparatus for an automatic transmission in which the shift lever can be shifted to any one of the automatic shift ranges in the automatic shift mode, the switching of the automatic shift mode to the manual shift mode in which each of the gear ratios in the automatic transmission can be selected manually and the operation for switching between the gear ratios in the manual shift mode can be effected easily and reliably so that operability in the operating apparatus can be largely improved.

The first aspect of the present invention is an operating apparatus for an automatic transmission, comprising: a shift lever which is shifted to each of a plurality of automatic shift ranges in an automatic shift mode; shift position detecting means which detects that the shift lever has been shifted to a specified automatic shift range; a manual shift mode changing switch provided in the vicinity of a steering wheel and which is operated for switching of the automatic shift mode to a manual shift mode in which each of gear ratios in the automatic transmission can be selected manually when it is detected by the shift position detecting means that the shift lever had been shifted to the specified automatic shift range; and a shift up/down switch which is provided in the vicinity of the steering wheel independently of the manual shift mode changing switch and which is manually operated for selecting each of the gear ratios in the manual shift mode.

In the operating apparatus according to the above aspect, the shift lever can be shifted to each of the automatic shift ranges in the automatic shift mode.

On the other hand, when the shift lever has been shifted to the specified automatic shift range, each of the gear ratios in the automatic transmission can be selected optionally and manually. More specifically, the shift position detecting means detects that the shift lever has been shifted to the specified automatic shift range. Further, in this state, when the manual shift mode changing switch is operated, the automatic shift mode is switched to the manual shift mode in which each gear ratio can be selected manually. Accordingly, in the manual shift mode, when the shift up/down switch is operated manually, each gear ratio can be selected optionally.

As described above, the operating apparatus according to the first aspect is structured such that the shift lever can be shifted to any one of the automatic shift ranges, switching of the automatic shift mode to the manual shift mode can be effected by operating the manual shift mode changing switch, and the operation for switching between the gear ratios in the manual shift mode can be effected by operating the shift up/down switch, these switches being provided in the vicinity of the steering wheel independently of each other. For this reason, even in a vehicle running state in which a driver is handling the steering wheel, the above operations (i.e., the switching of the automatic shift mode to the manual shift mode described above and the operation for switching between the gear ratios in the manual shift mode) can be facilitated so that operability of the operating apparatus can be largely improved.

DESCRIPTION OF THE PREFERRED EMBODIMENTS

Figure 1:
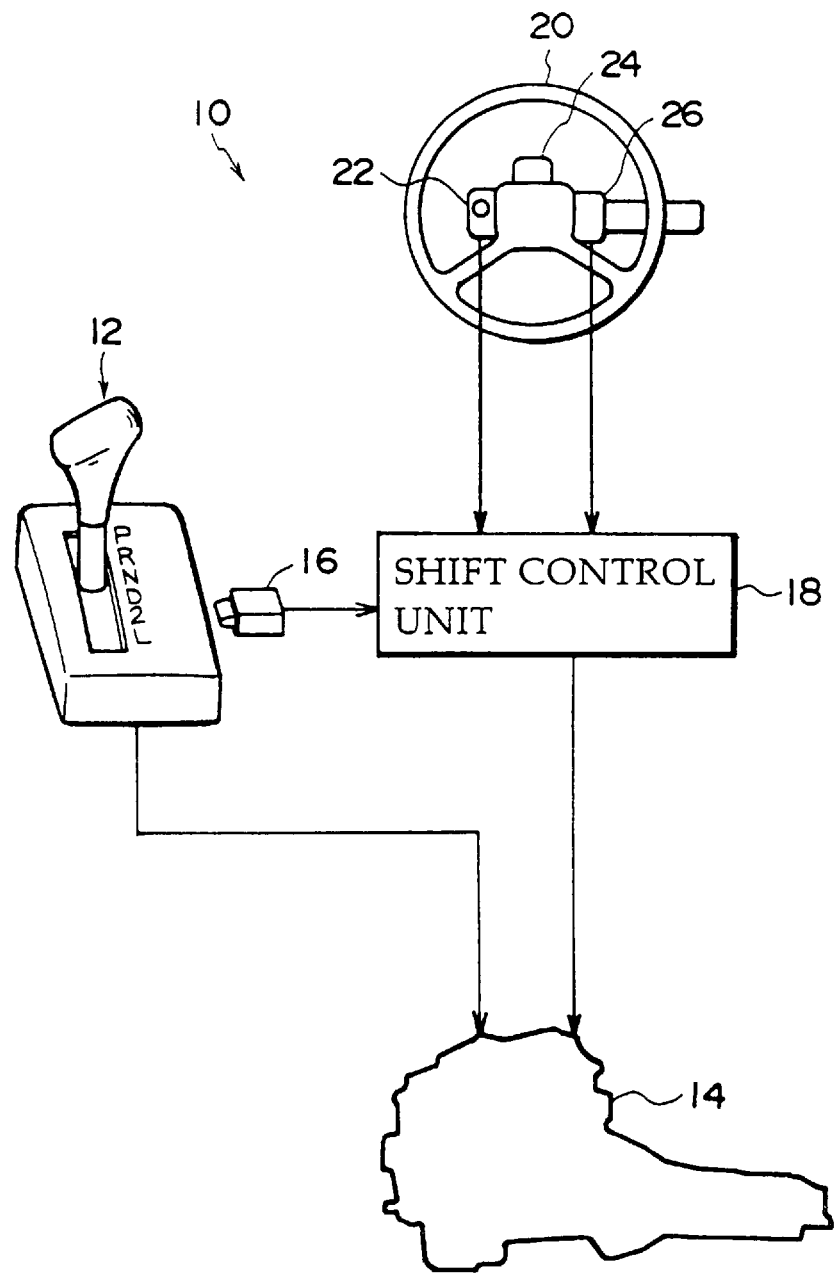
FIG. 1 is an overall structural schematic view of an operating apparatus for an automatic transmission according to an embodiment of the present invention.
Figure 2:
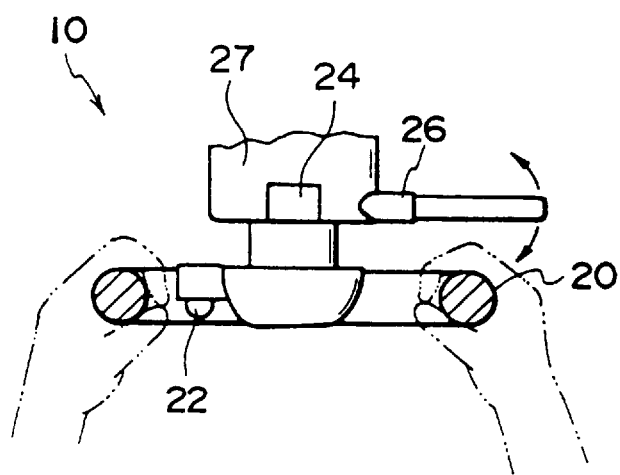
FIG. 2 is a cross-sectional view of a steering wheel of the operating apparatus according to the embodiment as seen from the upper direction of a vehicle.

The schematic overall structural view of an operating apparatus 10 for an automatic transmission according to an embodiment of the present invention is shown in FIG. 1.

The operating apparatus 10 has a shift lever 12 which is pivotable in a longitudinal direction of a vehicle (i.e., a straight type) and is connected to an automatic transmission 14 of the vehicle. Accordingly, any one of the automatic shift ranges "D" through "L" can be selected by shifting the shift lever 12 in the longitudinal direction of the vehicle.

Further, a micro-switch 16 serving as a shift position detecting means is provided so as to correspond to the shift lever 12 which has been positioned at the "D" shift range. The micro-switch 16 is connected to a shift control unit 18. When the shift lever 12 has been shifted to the "D" shift range, the micro-switch 16 is turned on by the shift lever 12 so that it is detected that the shift lever 12 has been shifted to the "D" shift range.

Further, a manual shift mode changing switch 22 is provided in the vicinity of a steering wheel 20 of the vehicle so as to be suitable for a left hand operation of a driver. The manual shift mode changing switch 22 is electrically connected to the automatic transmission 14 via the shift control unit 18. In the state that it has been detected by the micro-switch 16 that the shift lever 12 has been shifted to the "D" shift range, the manual shift mode changing switch 22 can manually be operated so as to be switched from the "D" shift range of the automatic shift mode to the manual shift mode.

In the manual shift mode, any one of gear ratios in the automatic transmission 14 can manually be selected, as will be described later. Further, various types of switch such as a seesaw type, a momentary type, a rotation type and the like can be used as the manual shift mode changing switch 22. In the present embodiment, the manual shift mode changing switch 22 is the type of a switch in which, when the manual shift mode changing switch 22 has been pushed once, the operating apparatus 10 is switched from the "D" shift range to the manual shift mode, and then, when the switch 22 has been pushed once, the shift mode of the operating apparatus 10 is changed from the manual shift mode state to the "D" shift mode.

A manual shift mode confirmation (i.e., indication) lamp 24 is provided in the vicinity of the steering wheel 20 so as to be suitable for a right hand operation of a driver. In the present embodiment, the lamp 24 is mounted on the steering column 27 and is connected to the shift control unit 18. The manual shift mode confirmation lamp 24 is turned on when the manual shift mode changing switch 22 has been operated so as to be switched from the "D" shift range to the manual shift mode in which each of the gear ratios in the automatic transmission 14 can be selected manually.

Moreover, a shift up/down switch 26 is provided in the vicinity of the steering wheel 20. In the present embodiment, the switch 26 is mounted to the steering column 27. The shift up/down switch 26 is provided independently of the manual shift mode changing switch 22. In a state in which the manual shift mode changing switch 22 has been operated so as to be switched from the "D" shift range to the manual shift mode, the shift up/down switch 26 can manually be operated toward a front or rear side of the vehicle for selecting any one of the gear ranges. Various types of switch such as a push/pull type in a vehicle front or rear direction, a seesaw type, a piano type and the like can be used for the shift up/down switch 26. The shift up/down switch 26 according to the present embodiment is a lever type of switch. Namely, when the switch 26 is pivoted toward a vehicle front side, a gear ratio in the automatic transmission 14 is shifted-up to the next upper gear ratio. When the switch 26 is pivoted toward a vehicle rear side, a gear ratio in the automatic transmission 14 is shifted-down to the next lower gear ratio.

Next, a description of an operation of the operating apparatus 10 according to the present embodiment will be given, hereinafter.

In the operating apparatus 10, one shift range in the automatic shift mode is usually selected from the automatic shift ranges by shifting the shift lever 12. That is, the shift lever 12 is shifted in a longitudinal direction of a vehicle so that one shift range is selected from "D" through "L" shift ranges.

Further, when the shift lever 12 has been shifted to the "D" shift range in the automatic shift mode, the automatic shift mode is switched to the manual shift mode in which each of the gear ratios in the automatic transmission 14 can be selected manually. More specifically, the micro-switch 16 detects a state in which the shift lever 12 has been shifted to the "D" shift range. Further, during the state in which the "D" shift range has been selected, when the manual shift mode changing switch 22 is operated, the shift mode of the operating apparatus 10 is switched from the "D" shift range to the manual shift mode so that the manual shift mode confirmation lamp 24 is turned on. In the manual shift mode, the shift up/down switch 26 is operated so that one gear ratio can be selected optionally from the gear ratios in the automatic transmission.

In this way, the operating apparatus 10 is structured such that one shift range in the automatic shift mode can be selected optionally from "D" through "L" shift ranges by shifting the shift lever 12 in the longitudinal direction of the vehicle, the switching of the operating apparatus 10 from the automatic shift mode to the manual shift mode and the operations for selecting each gear ratio in the manual shift mode are effected by the manual shift mode changing switch 22 and the shift up/down switch 26 which are provided in the vicinity of the steering wheel 20 independently of each other. For this reason, even in an ordinary vehicle running state in which a driver is handling the steering wheel 20 with his/her hands, the above operations (i.e., the switching of the automatic shift mode to the manual shift mode and the operation for selecting each gear ratio in the manual shift mode) can be facilitated a great deal without releasing his or her hands from the steering wheel 20.

As a result, operability in the operating apparatus for the automatic transmission can be largely improved.

Further, in the present embodiment, various types of switch such as a lever combination switch, a push switch, a rotary switch, an oscillating switch and the like can be used as the manual shift mode changing switch 22 and the shift up/down switch 26.

What is claimed is:

1. An operating apparatus for an automatic transmission of a vehicle having a steering wheel supported by a steering column, comprising:

a shift lever which is shifted to each of a plurality of automatic shift ranges in an automatic shift mode;

shift position detecting means which detects that the shift lever has been shifted to a specified automatic shift range;

a manual shift mode changing switch which is provided on one side of said steering column and which is operated for switching the automatic shift mode to a manual shift mode in which each of gear ratios in the automatic transmission can be selected manually when it is detected by the shift position detecting means that the shift lever had been shifted to the specified automatic shift range; and a shift up/down switch which is provided on an opposite side of said steering column independently of the manual shift mode changing switch and which is manually operated for selecting both higher and lower gear ratios in the manual shift mode.

2. An operating apparatus for an automatic transmission according to claim 1, further comprising manual shift mode indicating means which indicates that the automatic shift mode has been switched to the manual shift mode by the manual shift mode changing switch.

3. An operating apparatus for an automatic transmission according to claim 2, wherein the manual shift mode indicating means is a lamp which is turned on when the automatic shift mode has been switched to the manual shift mode.

4. An operating apparatus for an automatic transmission according to claim 1, wherein the shift up/down switch is provided at a steering column and is a lever type of the switch which shifts-up the gear ratio when said shift up/down switch is pivoted in a vehicle front direction and which shifts-down the gear ratio when said shift up/down switch is pivoted in a vehicle rear direction.

5. An automatic transmission operating apparatus according to claim 1, wherein the manual shift mode changing switch is a type of switch in which the automatic shift mode is switched to the manual shift mode when pushed once in the automatic shift mode and the manual shift mode is switched to the automatic shift mode when pushed once in the manual shift mode.

* * * * *